(No Model.)

P. GENDRON.
TIRE FOR WAGON WHEELS.

No. 294,461. Patented Mar. 4, 1884.

Attest:
A. Barthel
E. Scully

Inventor:
Peter Gendron
by his Att'y

UNITED STATES PATENT OFFICE.

PETER GENDRON, OF TOLEDO, OHIO, ASSIGNOR TO THE GENDRON IRON WHEEL COMPANY, OF SAME PLACE.

TIRE FOR WAGON-WHEELS.

SPECIFICATION forming part of Letters Patent No. 294,461, dated March 4, 1884.

Application filed August 1, 1883. (No model.)

*To all whom it may concern:*

Be it known that I, PETER GENDRON, of Toledo, in the county of Lucas and State of Ohio, have invented new and useful Improvements in Tires for Wagon-Wheels; and I do hereby declare that the following is a full, clear, and exact description thereof, reference being had to the accompanying drawings, which form a part of this specification.

This invention relates to certain new and useful improvements in the construction of that class of wagon-wheels in which a degree of elasticity is obtained in the tread, while all the rigidity of a metal tire is retained to keep the wheel in shape.

The invention consists in the method of attaching a rubber tire to a wheel, and in a metal-tired wheel having a rubber tire secured by pressing the edges of the metal tire against said rubber tire, as hereinafter more particularly described and claimed.

Figure 1:
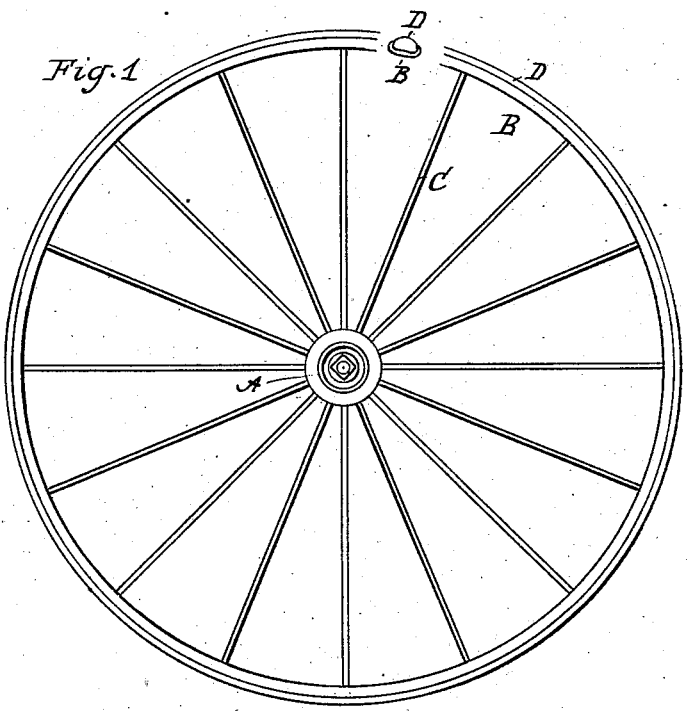
Figure 2:
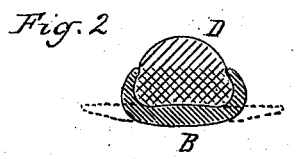

Figure 1 is an elevation of a wheel provided with my improved tire. Fig. 2 is a cross-section of the tire.

In the accompanying drawings, which form a part of this specification, A represents the hub, B the tire, and C the wire spokes, secured to the hub and tire in any of the known and approved ways. The tire is made wider than is usual, and thinner upon each edge than in the center, as shown in dotted lines in Fig. 2, and is centrally secured to the spokes. D is a supplemental tire. This is made of D shape, the flat part resting against the outer face of the mental tire. This tire is a rubber ring, the flat part of which is of hard rubber, while the oval part is left soft and elastic. After this supplemental tire has been centrally placed around the metal tire, the edges of the latter are bent inwardly to form a clamp to embrace the sides of the hardened part of the supplemental tire and hold the same in place, as shown in full lines in Fig. 2. This operation is preferably performed by means of a machine which will hold the rubber tire in place and at the same time form the clamp.

I am aware that it is not new to provide a wheel-tire with a rubber tire of hard and soft rubber, and that rubber tires having metal cores have been used with U-shaped flanges, and make no claim to either of these devices.

What I claim as my invention, and desire to secure by Letters Patent, is—

1. The method herein described of making a rubber-tired wheel, which consists in first securing to the spokes a thin-edged metallic tire having said thin edges extending outwardly, then putting the rubber tire around the metal tire, and finally pressing the edges of the said metallic tire against the sides of the rubber tire, substantially as described.

2. A carriage-wheel provided with a thin metal tire, and a supplemental tire formed partly of soft and partly of hard rubber, and held in place by turning the edges of the metal tire against the hard rubber, substantially as described.

PETER GENDRON.

Witnesses:
H. S. SPRAGUE,
E. SCULLY.